United States Patent [19]

Hagiuda et al.

[11] Patent Number: 5,724,620
[45] Date of Patent: Mar. 3, 1998

[54] WIRELESS LIGHT-AMPLIFYING STROBE SYSTEM AND STROBE DEVICE USABLE WITH THE SYSTEM

[75] Inventors: Nobuyoshi Hagiuda, Yokohama; Hideki Matsui, Fujisawa; Ryotaro Takayanagi, Yokohamashi; Hiroshi Sakamoto, Kawasaki, all of Japan

[73] Assignee: Nikon Corporation, Tokyo, Japan

[21] Appl. No.: 594,370

[22] Filed: Jan. 30, 1996

Related U.S. Application Data

[63] Continuation of Ser. No. 201,389, Feb. 24, 1994, abandoned.

[30] Foreign Application Priority Data

Mar. 10, 1993 [JP] Japan ............................. 5-076118

[51] Int. Cl.⁶ .......................................... G03B 15/03
[52] U.S. Cl. .................................. 396/182; 396/171
[58] Field of Search ............................... 354/131, 132, 354/140, 416; 396/159, 160, 161, 171, 180, 182

[56] References Cited

U.S. PATENT DOCUMENTS

| | | | |
|---|---|---|---|
| 2,408,764 | 10/1946 | Edgerton | 354/132 |
| 4,155,029 | 5/1979 | Yamaoka | 315/151 |
| 4,242,616 | 12/1980 | Takematsu | 354/132 |
| 4,275,953 | 6/1981 | Watanabe et al. | 354/416 |
| 4,368,966 | 1/1983 | Hagyuda | 354/416 |
| 4,486,086 | 12/1984 | Kresock | 354/416 |
| 4,771,301 | 9/1988 | Yamada | 354/132 |
| 4,816,850 | 3/1989 | Philipeauk et al. | 354/127.1 |
| 4,897,684 | 1/1990 | Serikawa | 354/416 |
| 4,963,914 | 10/1990 | Taniguchi et al. | 354/413 |
| 5,016,037 | 5/1991 | Taniguchi et al. | 354/413 |
| 5,384,611 | 1/1995 | Tsuji et al. | 354/131 |

FOREIGN PATENT DOCUMENTS

| | | |
|---|---|---|
| 53-130020 | 11/1978 | Japan. |
| 4343339 | 11/1992 | Japan. |
| 4343343 | 11/1992 | Japan. |
| 4343344 | 11/1992 | Japan. |

*Primary Examiner*—Safet Metjahic
*Assistant Examiner*—Nicholas J. Tuccillo
*Attorney, Agent, or Firm*—Oliff & Berridge

[57] ABSTRACT

A wireless light amplifying strobe system appropriately regulates the commencement and cessation of each strobe's light emission to enable the radiation intensity of the light emissions to be accurately set. For example, a wireless light-amplifying system has a strobe that is attached to a camera (the primary strobe) and a strobe that is separated from the first strobe (the auxiliary strobe). The primary strobe repeatedly emits a low-intensity flash of light, and the auxiliary strobe detects the emission of light from the primary strobe and repeatedly emits a fixed, low-intensity flash of light upon each emission of light from the primary strobe. The camera measures the light that is reflected from the subject being photographed, which is illuminated by both strobes, with a photometer circuit that passes through the photographic lens. When the proper exposure has been reached, the primary strobe's light emission ceases. When the primary strobe stops emitting light, the auxiliary strobe no longer detects the emission of light from the primary strobe, and automatically ceases its own light emission.

30 Claims, 4 Drawing Sheets

WIRELESS LIGHT-AMPLIFYING STROBE SYSTEM AND STROBE DEVICE USABLE WITH THE SYSTEM

This is a Continuation of application Ser. No. 08/201,389 filed Feb. 24, 1994, now abandoned.

BACKGROUND OF THE INVENTION

1. Field of the Invention

This invention concerns a wireless light-amplifying strobe system that has a primary strobe device attached to a camera or other device and an auxiliary strobe device installed separate from the camera with its light emission regulated in a wireless manner.

2. Description of Related Art

Prior art devices exist that use multiple strobes. When photographing with light-amplifying strobes, in which the camera and each strobe are connected with cords, emission commencement and cessation signals are sent to each strobe to simultaneously regulate all of them. However, when using this method, the space in which the strobes may be set up is limited by the cords, and when the number of strobes is increased the number of cords also increases and the connections become intricate. Accidents result, such as getting caught up in the cords.

In order to eliminate this inconvenience, a wireless, light emission-regulating strobe that detects the light emission of a strobe that is affixed to the body of a camera is proposed in patent publication Sho 58-21793. This strobe detects the emission of light from a strobe that is affixed to the camera body and commences its own emission of light, and detects the cessation of light emission and causes its own light emission to cease.

Wireless strobe devices are also proposed in patent publications Hei 1-254926 and Sho 58-130020 that improve on the device described in the aforementioned Sho 58-21793.

The wireless or auxiliary strobe proposed in patent publication Sho 58-21793 detects the commencement of light emission from a strobe attached to the camera body (the primary strobe) and commences its own light emission, and detects the cessation of the primary strobe's light emission causing the cessation of its own light emission. When light emission ceases, because the wireless strobe is still emitting light, reflected light that accompanies its own light emission enters into the light receptacle, and it is difficult to detect the change in the light from the primary strobe. As a result, there is the concern that the change in light accompanying the primary strobe's cessation of light emission could not be detected, so light would continue to be fully emitted, and the proper exposure would not be obtained.

In patent publications Hei 1-254926 and Sho 53-130020, in order to resolve those deficiencies, a method is proposed that causes a strobe that is installed separate from the primary strobe in a wireless manner ('the auxiliary strobe') to flash intermittently while the primary strobe is flashing. While the auxiliary strobe is not emitting light, it detects whether the primary strobe is continuing its emission of light or ceasing it. However, this method requires a complicated means to detect and decide whether or not the primary strobe is emitting light. Also, because the primary strobe emits light continually while the light emission from the auxiliary strobe is intermittent, there is the problem of not being able to set the intensity of light radiation from each strobe.

SUMMARY OF THE INVENTION

Therefore, in light of the problems discussed above, it is one objective of this invention to propose a wireless light-amplifying strobe system that will reliably carry out the commencement and cessation of light emission, and by which the intensity of light radiation of each strobe may be accurately set.

The present invention accomplishes the above objective by providing a wireless light-amplifying strobe system that connects multiple strobe devices together in a wireless manner and regulates their light emission.

The system includes: a primary strobe device that repeatedly emits intermittent flashes of light of a fixed quantity, based on light emission commencement instructions; and an auxiliary strobe device that has a means for detecting the light emission of the aforementioned primary strobe device. The auxiliary strobe device repeatedly emits a fixed quantity of light upon each detection of the aforementioned primary strobe device's light emission, and ceases its intermittent light emission in accordance with the cessation of the intermittent light emission of the aforementioned primary strobe device.

The auxiliary strobe device only has to detect the commencement of light emission from the primary strobe, and does not need to detect its cessation. Therefore, the current problem of the auxiliary strobe's inability to regulate because it fails to detect the cessation of light emission from the primary strobe due to its own light emission may be avoided, and the intensity of light radiation from each strobe device can be suitably set.

BRIEF DESCRIPTION OF THE DRAWINGS

A preferred embodiment of the invention will be described in detail with reference to the following drawings wherein like elements bear like reference numerals, and wherein.

DETAILED DESCRIPTION OF THE PREFERRED EMBODIMENTS

Figure 1:
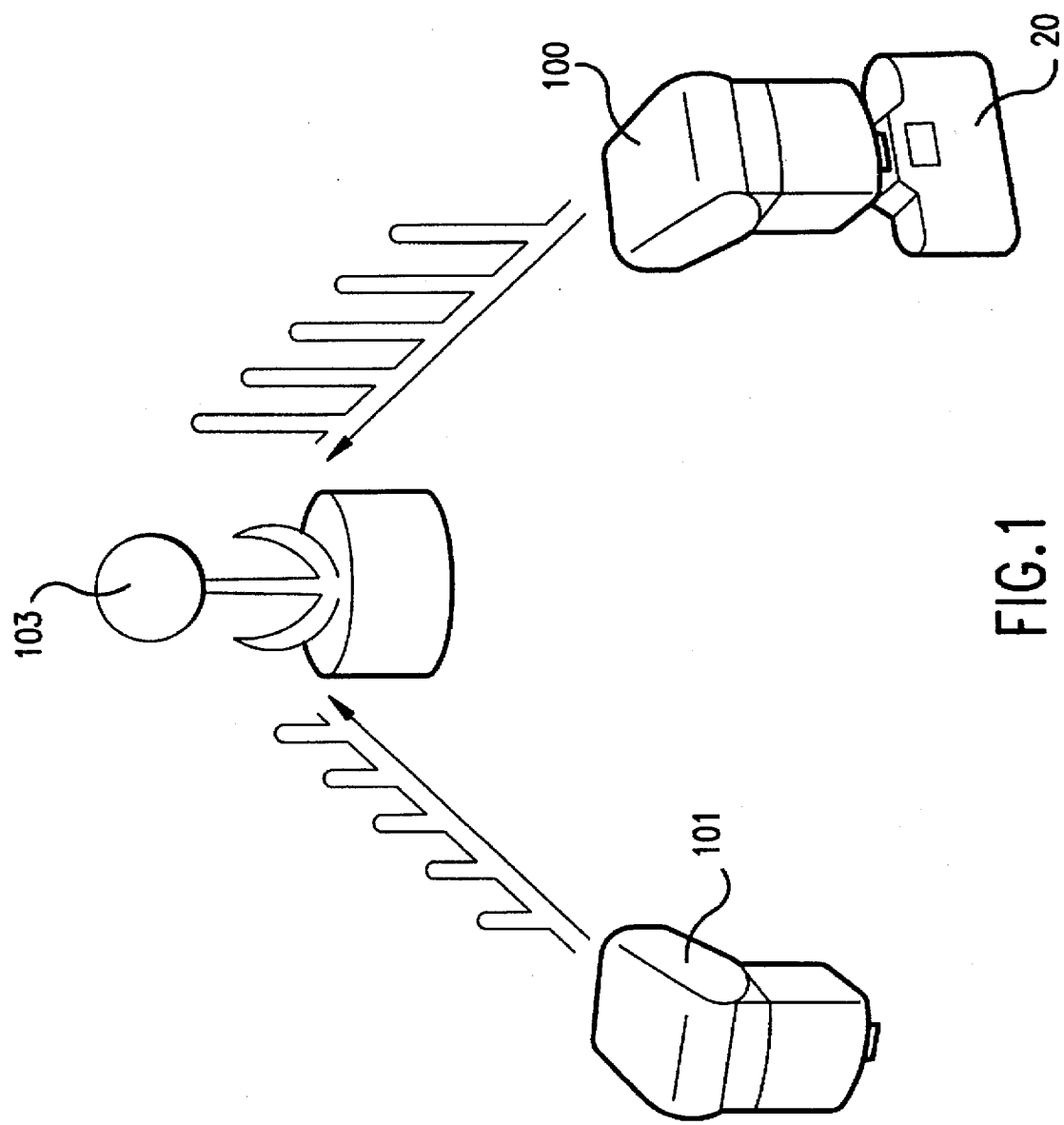
FIG. 1 is a schematic drawing that shows the arrangement of the strobe system of this invention and how it is used.

FIG. 1 shows the arrangement and use of the wireless light-amplifying strobe system according to this invention. As shown in FIG. 1, the wireless light-amplifying strobe system includes, as an example, a primary strobe 100 attached to the camera 20 and an auxiliary strobe 101. With this kind of system, the primary strobe 100 repeatedly emits a low-intensity light flash, and the auxiliary strobe 101 detects the emission of light from the primary strobe, commences its own emission of light, and repeatedly emits a fixed, low-intensity light flash each time the primary strobe 100 emits light. When the camera 20 measures the light reflected from the subject being photographed 103, which is illuminated by the primary strobe 100 and by the auxiliary strobe 101, by means of a photometer circuit that measures light through the photographic lens, and when the right exposure has been reached, it stops the emission of light from the primary strobe 100. When the emission of light from the primary strobe 100 ceases, the auxiliary strobe 101 no longer detects the emission of light from the primary strobe 100 and automatically stops emitting light.

Figure 2:
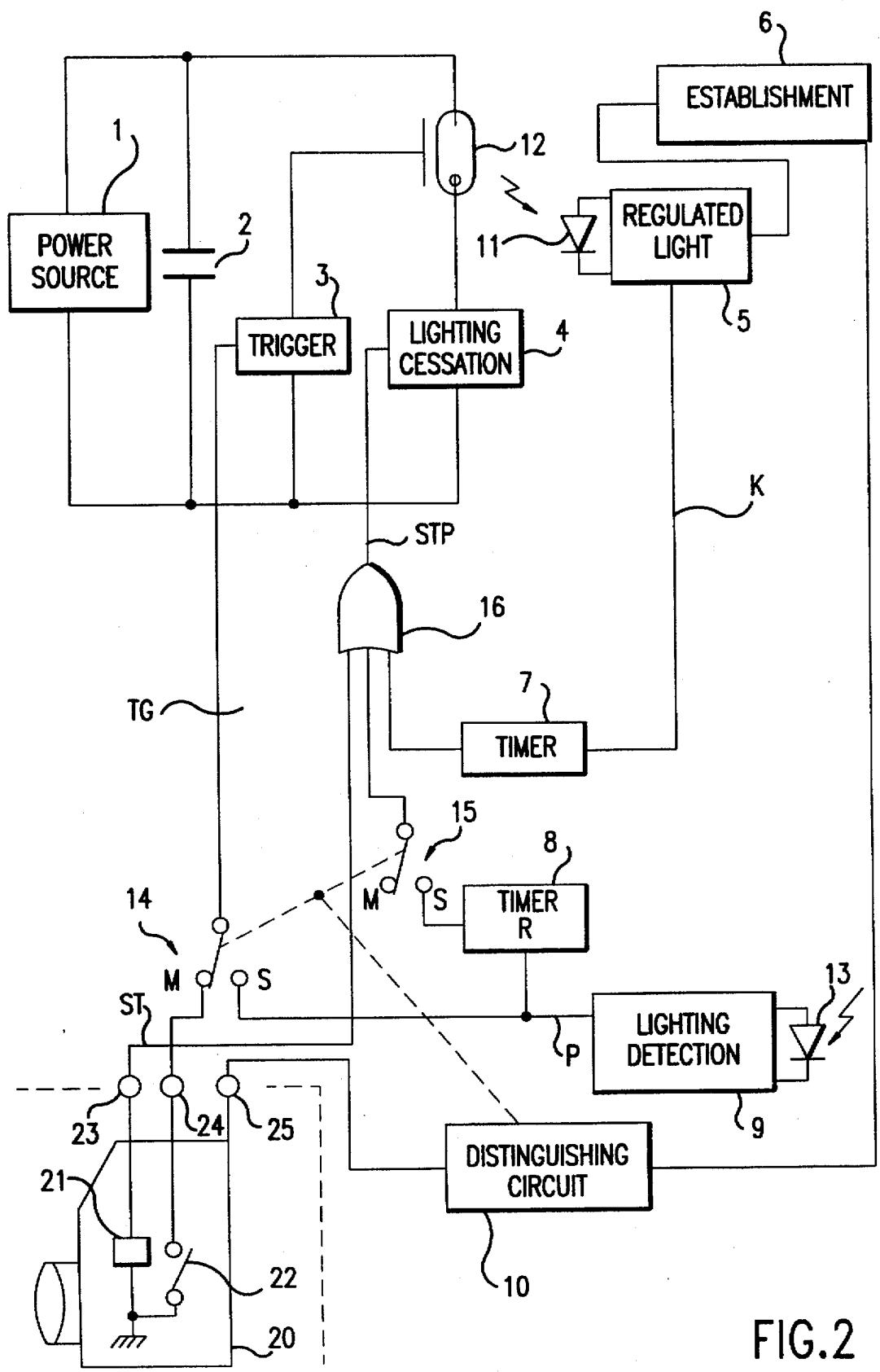
FIG. 2 is a circuit diagram that shows the construction of a preferred embodiment of the strobe device of this invention.
Figure 3:
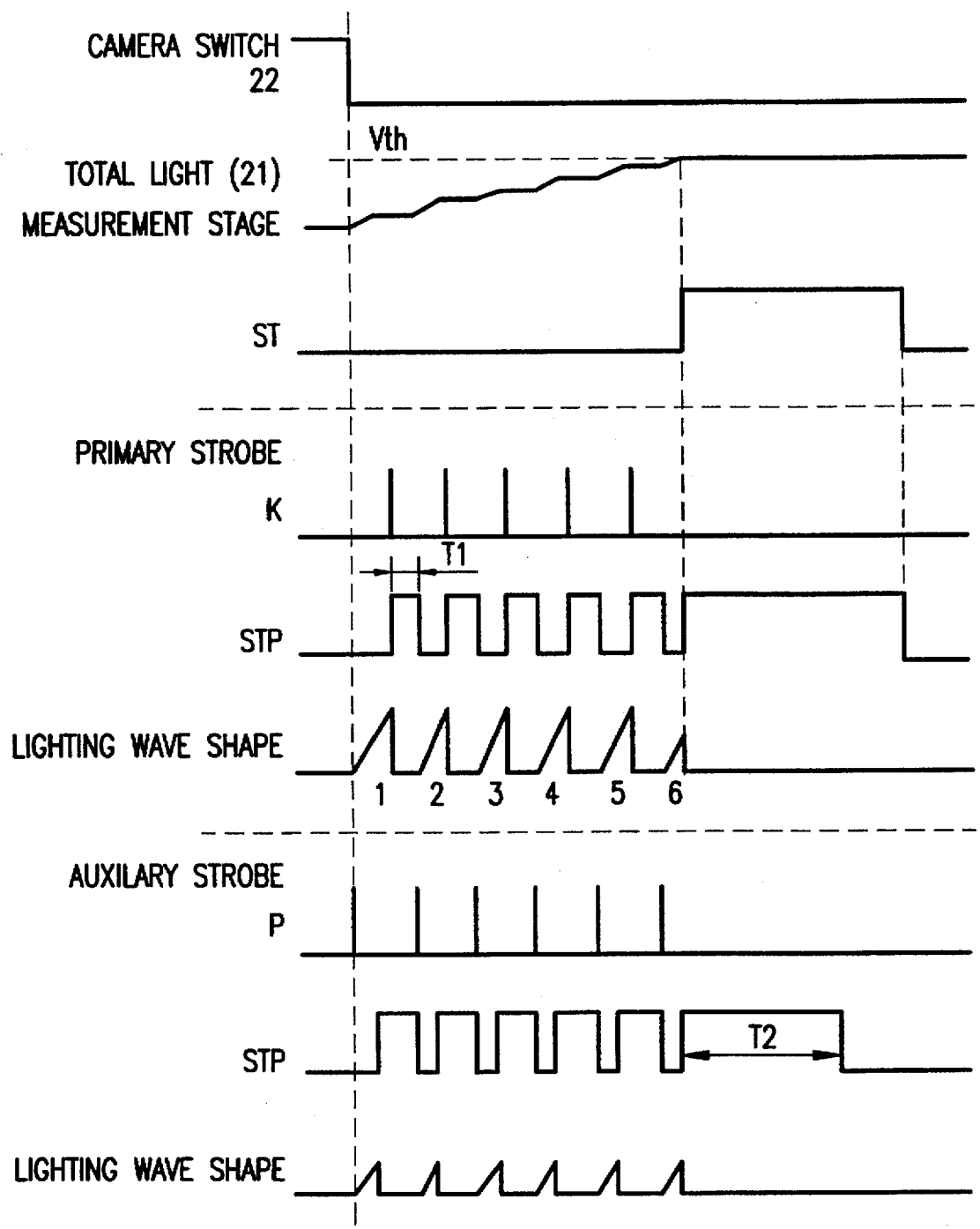
FIG. 3 is a timing chart that shows the action of the strobe device in FIG. 2.

FIG. 2 is a circuit diagram of a strobe that can be used with the strobe in FIG. 1. FIG. 3 is a timing chart that shows the movement of the strobe circuit in FIG. 2. The power supply 1 increases the voltage of an ordinary battery to a high voltage using a DC-DC converter. It recharges the primary condenser 2 with light-emitting energy. The electrical discharge tube 12 emits light by conducting the charge from the primary condenser 2. The mechanism 4 for stopping the emission of light comprises a switching circuit that becomes conductive when the electrical discharge tube 12 emits light, discharging the charge of the primary condenser 2 through the electrical discharge tube 12, and becomes non-conductive when the emission of light ceases. A commonly known switching component such as an IGBT (Insulated Gate Bipolar Transistor) is used for this mechanism 4. A trigger device 3 releases the camera 20 when the mechanism 4 that stops the emission of light 4 is in a state of conductivity, and sends a high voltage to the trigger electrode of the electrical discharge tube 12 when the light emission commencement signal is sent, causing the commencement of the light emission of the electrical discharge tube.

The primary/auxiliary strobe distinguishing device 10 determines whether the strobe should function as the primary or auxiliary strobe. When the strobe of this invention is attached to the camera 20, the distinguishing device 10 is connected by the distinguishing signal that is conveyed through terminal 25 of the camera/strobe connecting terminals 23, 24, 25 and detects that it is the primary strobe, whereupon the interlocking switches 14, 15 automatically switch to the M (primary strobe) side.

On the other hand, if the strobe is not attached to the camera, the switches 14, 15 are automatically changed to the S side, and the distinguishing device 10 determines that the strobe acts as an auxiliary strobe.

The movement that occurs when the strobe in FIG. 2 is used as the primary strobe is described with reference to FIGS. 2 and 3. It is first assumed that the switches 14, 15 have been automatically changed to the M side.

When the camera is released the contact point 22 closes, the light emission commencement signal (TG) is conveyed to the strobe side through the terminal 24 of the camera and strobe, moving the trigger device 3 via the M side of switch 14 and triggering the electrical discharge tube 12. At this point, the mechanism 4 that stops light emission is conductive, and the electrical discharge tube 12 begins emitting light.

The light emission of the electrical discharge tube 12 illuminates the subject being photographed, and part of it falls on the light receiving element 11 of the light adjusting device 5. When the electrical discharge tube 12 is determined by the light adjusting device 5 to attain fixed, low-intensity radiance, the light adjusting device 5 outputs a light adjusting signal to a first timing device 7 and a second timing device 8. The output of the second timer 8 is not conveyed to the OR gate 16 and has no effect because the switch 15 is changed to the M side (in this case, the input of the OR gate is set to the L level). The first timing device 7 commences its timing action through the light adjusting signal (K), and inputs to the OR gate 16, which continues its fixed-interval (T1) output at level H. Therefore, the OR gate 16 maintains the output (STP) at level H throughout T1. When the mechanism 4 that stops light emission receives input from the light emission cessation signal (STP) at the H level, it becomes non-conductive, and the electrical discharge tube 12 causes the cessation of light emission. Interval T1 is set to several dozen microseconds. The IGBT is set above the necessary time interval in order to prevent the destruction of the IGBT when it repeatedly becomes conductive then non-conductive, without a sufficient period of non-conductivity.

When the timing action of the first timer 7 ends, the output (STP) of the OR gate 16 becomes level L and the stop light mechanism 4 is once again conductive. After the electrical discharge tube 12 has stopped emitting light for a short time (T1), the electrical discharge tube 12 once again emits light without the effect of the trigger device 3 because the electrical discharge path is once again formed. It continues to repeat the light emission and cessation described above. During this time, the auxiliary strobe also repeats the starting and stopping of light emission, as will be explained hereafter. The light measuring device 21 inside the camera 20 integrates the quantity of the light from the primary and auxiliary strobes reflected by the subject being photographed, and outputs the light emission cessation signal (ST) to terminal 23 when it reaches a fixed position (Vth) that is the right exposure (the 6th light emission on the timing chart of FIG. 3). The light emission cessation signal (ST) is input into the OR gate 16, and the output (STP) becomes the H level. The light emission cessation signal (ST) that is output from the camera completely stops the emission of light from the electrical discharging tube 12, and the output interval is sufficiently long for it to not emit light again. Therefore, at this juncture, the light emission from the primary strobe ceases, the subject being photographed is properly exposed, and one set of light-emitting actions is completed.

When the strobe of FIG. 2 is used as an auxiliary strobe, the auxiliary strobe (not attached to the camera) discerns through the primary/auxiliary distinguishing device 10 that it is not attached to the camera 20. It then determines that it is the auxiliary strobe and automatically changes the interlocking switches 14, 15 to the S side.

In the case of the auxiliary strobe, the input of the trigger device 3 is connected to the output of the light emission detection device 9. The light emission detection device 9 detects the emission of light from the primary strobe using the light receiving element 13, and conveys the output (P) to the trigger device 3. When it detects the first light emission of the primary strobe, the trigger device 3 sends high voltage to the trigger electrode of the electrical discharge tube 12. At this point, since the light emission cessation device 4 is conducting, the auxiliary strobe's first light emission commences.

The light emission detection output (P) is again conveyed to the reset input of the second timer 8 and, if the second timer 8 is in the middle of its timing action, interrupts that timing action and causes the output to go to level L.

When the first light emission of the auxiliary strobe commences and the light adjusting device 5 monitors the light emission of electrical discharge tube using the light receiving element 11 in the same way as the primary strobe and emits a fixed amount of low-intensity light, it outputs the light adjusting signal (K) to the first and second timers 7 and 8. Each timer receives the signal and commences its timing action. The first timer 7 performs a timing action that is at the same interval as that of the primary strobe and outputs a high level (level H) throughout time T1. The timing interval of the second timer 8 is set at a longer interval (T2). During the second timer's 8 timing interval (T2), when the light emission cessation device 4 is non-conductive, the emission of light from the electrical discharge tube 12 completely stops, and a sufficiently long interval is set so that even if the light emission cessation device 4 becomes conductive again, it can not repeat the emission of light.

When the auxiliary strobe completes its first emission of light, it awaits the next light emission, with the light emission cessation device in the non-conductive state. When the light emission detection device 9 detects the second light emission of the primary strobe and the second light emission detection output (P) occurs, the light emission detection output (P) is conveyed to the reset input (R) of the second timer 8, the timing action of the second timer 8 is interrupted, and the output goes to level L. Thus, at the point at which the timing action of the second timer 8 is interrupted or at the point at which the first timer 7 finishes its timing action, whichever is slowest, the output of the OR gate 16 goes to level L, and the auxiliary strobe again begins emitting light. Since the auxiliary strobe is separated from the camera, the other input of the OR gate 16 is not used, and stays at the lowest level (level L).

The auxiliary strobe repeats this action. As the timing chart in FIG. 3 shows, after the light emission detection device 9 detects the last light emission (number 6) of the primary strobe and the light emission detection output (P) resets the second timer 8, when the auxiliary strobe begins its sixth light emission and ends its fixed-quantity light emission, the light adjusting device 5 outputs the light adjusting signal (K) and the timing action of the second timer 8 begins again. After this, because the primary strobe does not perform the light-emitting action, the second timer 8 is not reset during its timing action, and inputs the output at level H into the OR gate 16 during the fixed timing interval (T2). Thus, since the output (STP) of the OR gate during interval T2 is at level H, the light emission cessation device 4 maintains non-conductivity for a long period of time, completely stopping the electrical discharge of the electrical discharge tube 12, and the auxiliary strobe ceases its emission of light.

As described above, the primary strobe repeatedly emits a fixed quantity of low-intensity light, and the auxiliary strobe emits a fixed quantity of low-intensity light in the same way each time the primary strobe emits light. The photometer 21 of the camera integrates the radiation intensity of the light reflected from the subject being photographed by the primary and auxiliary strobes and outputs the light emission cessation signal (ST) through terminal 23 when it reaches the set value that corresponds with the correct exposure, causing the light emission of the primary strobe to cease. Following the cessation of the primary strobe's light emission, it causes the light emission of the auxiliary strobe to cease.

A light radiation intensity setting device 6 sets the light radiation intensity. The light adjusting device 5 is a means to adjust the intensity of each light emission from the primary and auxiliary strobes. If the primary/auxiliary determining device 10 determines that it is attached to the camera and is therefore the primary strobe, it conveys the output based on the photographic information (distance, stop, and film speed information) conveyed from the camera to the light radiation intensity setting device 6, which automatically sets the proper radiation intensity for each light emission on the light adjusting device 5.

In cases in which the photographing distance is short, or the stop is opened, or in which high-speed film is being used, and it is estimated from this combined information that the radiation intensity required to obtain the correct exposure will be relatively small, the radiation intensity of each light emission from the primary strobe is decreased. However, it is ensured that the number of light emissions to achieve the proper exposure will not decrease too much, and the aberration from the correct exposure is minimized as much as possible.

Conversely, in cases in which the photographing distance is great, or in which the photographic stop is on the small side, or in which a low-speed film is being used, and it is estimated from this combined information that the light intensity required for the correct exposure will be comparatively large, the intensity of each light emission from the primary strobe increases. However, it is ensured that the entire time of the light emission will not be too long, and the radiation intensity setting device 6 sets the radiation intensity on the light adjusting device 5 so that each light emission will be finished within the time regulated by the shutter.

The radiation intensity setting device 6 also has a manual input device (not shown), and it is possible for the photographer to manually set the radiation intensity of each light emission.

Needless to say, the radiation intensity of each light emission, which is set by hand or automatically, is displayed on an indicator that utilizes a liquid crystal panel or other such device. The photographer can look at the numerical value of the fixed radiation intensity on the indicator and set the ratio of the radiation intensities of the primary and auxiliary strobes. For example, if it is set up so that the set radiation intensity can be set with +2 EV, +1 EV, 0 EV, −1 EV, and −2 EV as the standard guide numbers, in the case in which the radiation intensity of the primary strobe is automatically +1 EV based on the photographic information from the camera, the radiation intensity of the auxiliary strobe will be the same as that of the primary strobe if the auxiliary strobe is manually set to +1 EV. If it is set to 0 EV, it will emit light at ½ times the intensity, and if it is set to −1 EV, it will emit light at ¼ times the intensity. The light emission of the two strobes can be freely changed, and the lighting can thus also be changed.

Figure 4:
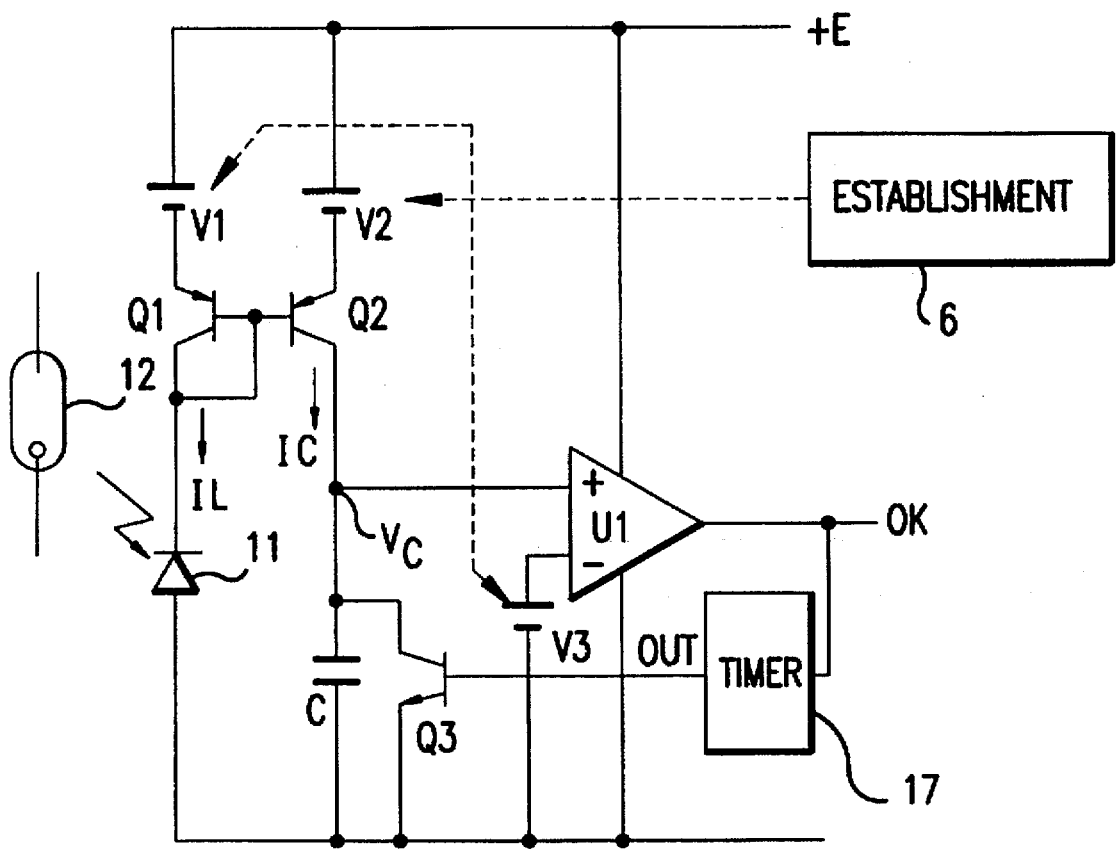
FIG. 4 is a specific circuit diagram of the light adjusting device used in the strobe device in FIG. 2.
Figure 5:
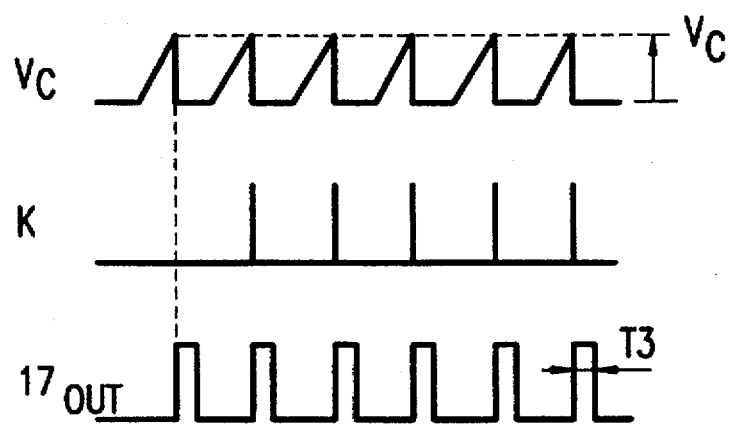
FIG. 5 is a timing chart that shows the action of the light adjusting device in FIG. 4.

FIG. 4 is a specific circuit diagram of the light adjusting device 5 used in the strobes of FIG. 1. FIG. 5 is a timing chart that shows its movement.

In FIG. 4, part of the light emitted from the electrical discharge tube 12 falls on the light-receiving element 11 and is converted to photoelectric current ($I_L$). After transistors Q1 and Q2 form a current mirror circuit and the photoelectric current is amplified or decreased by the effect of the power sources V1, V2 through the current mirror circuit, it is output as electric current ($I_C$) and discharges the integrated condenser (C). When the discharging voltage (VC) of the integrated condenser (C) reaches the standard voltage (V3) of the voltage comparison indicator (U1), the output (K) of the voltage comparison indicator (U1) is at level H. As the output (K) of the voltage comparison indicator (U1) causes the cessation of light emission from the electrical discharge tube 12 in the manner described above, it is also input into a third timing device 17. The third timing device 17 outputs at level H for a fixed interval, causes the discharging transistor (Q3) to conduct, and discharges the charge of the integrated condenser (C). At the same time, the electrical discharge tube 12 stops emitting light and the photoelectric current ($I_L$) and the output electric current ($I_C$) become zero, because of which the integrated condenser (C) is not discharged until the next emission of light. The light adjusting device 5 repeats the actions described above upon each emission of light.

Transistors Q1 and Q2 are arranged within the IC (Integrated Circuit). When their electrical characteristics are identical, and when the voltage amplification ratio is sufficiently high that base current can be ignored in relation to the collector current, they can very closely approximate each other. A relationship exists between the photoelectric current ($I_L$) and the output electric current ($I_C$). Because the base currents of transistors Q1 and Q2 are the same, $$V1+(kT/q)ln(I_L/I_S)=V2+(kT/q)ln(I_C/I_S) \qquad (1)$$

where k=Boltzmann constant
T=absolute temperature
q=electronic capacitance
$I_S$=diode's reverse direction saturation current value
Reducing, equation (1) obtains the following equation:

$$(kT/q)ln(I_L/I_C)=V1-V2, \qquad (2)$$

and, further reducing obtains relationship:

$$G=I_L/I_C=EXP\{(q/kT)(V1-V2)\} \qquad (3)$$

At this point, if we assume that voltages V1 and V2 are power sources that are proportional to the absolute temperature T, then (V1−V2) will be proportional to the absolute temperature T. It follows that the amplification ratio (or reduction ratio) G of the output electric current ($I_C$) to the photoelectric current ($I_L$), shown in equation (3), is no longer dependent upon temperature.

In other words, the setting of the light emission intensity setting device 6 may have the amplification ratio (or reduction ratio) G of the output electric current ($I_C$) to the photoelectric current ($I_L$) changed through setting voltage V1 or V2, and the intensity of each light emission from the electrical discharge tube 12 may be adjusted over a wide range, from low intensity to high intensity.

Also, by setting the light emission intensity setting device 6, it is possible to adjust the light emission intensity by changing the standard voltage (V3) of the voltage comparison indicator (U1).

Moreover, a photometer circuit that measures the light reflected from the subject being photographed and stops the emission of light when the correct exposure has been reached can be built into the camera's interior (TTL). However, if the strobe itself has a photometer circuit, the same type of regulation is possible. In this case, this invention may be used even if the camera does not have a TTL photometric function.

This system has been described by explaining each strobe (the primary and auxiliary strobes) separately, but the system of this invention may also be used with three or more strobes. Needless to say, in that case the strobe attached to the camera becomes the primary strobe, while each of the other strobes are automatically set to be auxiliary strobes.

Using this invention as described above, on the wireless light-amplifying strobe system that connects multiple strobes together in a wireless manner and regulates their light emission, the primary strobe repeatedly emits a fixed, low-intensity light, the auxiliary strobe that has detected the emission of light from the primary strobe also repeatedly emits a fixed, low-intensity light, and the camera measures the light that is reflected from the subject being photographed, which is illuminated by both strobes, with the photometer circuit that passes through the photographic lens and obtains the proper exposure. Therefore, the auxiliary strobe only needs to detect the beginning of light emission from the primary strobe, thereby eliminating the problem on the current models of the auxiliary strobe being interfered with by its own light and becoming unable to detect the cessation of light emission from the primary strobe. Also, the auxiliary strobe only needs to detect the commencement of light emission from the primary strobe, so the detecting circuit becomes simple. Because the primary strobe and the auxiliary strobe both repeat the same kind of intermittent light emission, the light emission regulating circuit also may be simplified, and a single strobe device that can be changed to either the primary strobe or the auxiliary strobe may be easily constructed. Also, the respective radiation intensities of the primary strobe and of the auxiliary strobe are each independent and may be accurately and freely set, and it becomes possible to accomplish a quality photograph along the photographer's line of sight.

Also this device can use a single unit as both the primary and auxiliary strobes, so an auxiliary strobe automatically becomes the primary strobe when it is attached to a camera. Therefore, there are no erroneous settings. In the instance that the camera does not have automatically changing master and slave signals, the manual changing switch on the strobe may be used.

The invention has been described with reference to preferred embodiments thereof, which are illustrative and not limiting. Various changes may be made without departing from the spirit and scope of the invention, as defined in the appended claims.

What is claimed is:

1. A wireless light amplifying strobe system for a camera controlling light emission of multiple strobes, comprising:

a distinguishing circuit located within each of the strobes that automatically sets each of the strobes to be in one of two states: a primary state when one of the strobes is attached to the camera and operates in a wired manner as a primary strobe, the primary strobe being capable of repeatedly emitting intermittent primary flashes of light; with each exposure and an auxiliary state when at least one of the strobes is not attached to the camera and operates in a wireless manner as at least one auxiliary strobe, the at least one auxiliary strobe being capable of repeatedly emitting auxiliary flashes of light; with each exposure a light intensity determination circuit within the primary strobe that determines an intensity of each of the intermittent primary flashes of light based on photographic information conveyed from the camera, the photographic information including a distance from the camera to an object being photographed, a diaphragm value of a lens being used on the camera and a speed of film being used in the camera; and a detector in the at least one auxiliary strobe for detecting commencement of each of the intermittent primary flashes of light of the primary strobe without monitoring cessation of each of the intermittent primary flashes of light and actuating the at least one auxiliary strobe to emit the auxiliary flashes in response to each of said intermittent primary flashes of light.

2. The system of claim 1, further comprising a lighting cessation device connected to the primary and auxiliary strobes for causing the strobes to cease emitting said flashes of light.

3. The system of claim 1, further comprising a light radiation intensity setting device contained in the primary and auxiliary strobes for setting the intensity of the flashes emitted from the strobes.

4. The system of claim 1, wherein the detector in the at least one auxiliary strobe includes:

a light emission detection device for detecting commencement of each of said primary flashes and outputting a detection signal in response to said detected primary flashes; and a trigger device connected to the light emission detection device for sensing the detection signal and triggering the auxiliary strobe to emit an auxiliary flash in response to the detection signal.

5. The system of claim 1, further comprising a light emission intensity specification member disposed on the primary strobe that allows manual setting of the intensity of each of the primary flashes of light regardless of the light intensity determined by the light intensity determination circuit.

6. The system of claim 5, further comprising a display device disposed on the primary strobe which displays the light intensity of the primary flashes of light.

7. The system of claim 1, further comprising a trigger device contained within the primary and auxiliary strobes for triggering the primary and auxiliary flashes.

8. The system of claim 7, wherein the distinguishing circuit includes a first switch and a second switch within the primary and auxiliary strobes, the first and second switches being switched to a primary position when one of the strobes is in the primary state and to an auxiliary position when one of the strobes is in the auxiliary state.

9. The system of claim 8, wherein the first switch connects the trigger device to the detector when the distinguishing circuit determines that the at least one strobe is in the auxiliary state and connects the trigger device to the camera when the distinguishing circuit determines that the strobe is in the primary state.

10. The system of claim 9, further comprising a light measuring and integrating device in the camera for measuring and integrating a quantity of light emitted from the primary and auxiliary strobes and for outputting a light emission cessation signal to the trigger device in the primary strobe when the quantity of light from the primary and auxiliary strobes reaches a preselected quantity.

11. The system of claim 10, wherein the second switch connects the lighting cessation device to a timer when the distinguishing circuit detects that the strobe is in the auxiliary state, the timer controlling a duration of the auxiliary flashes.

12. A method for controlling light emission of a wireless light amplifying strobe system for a camera having multiple strobes, the method comprising the steps of:

automatically setting each of the strobes to be in one of two states: a primary state when one of the strobes is attached to the camera and operates in a wired manner as the primary strobe, the primary strobe being capable of for repeatedly emitting intermittent primary flashes of light; with each exposure and an auxiliary state when at least one of the strobes is not attached to the camera and operates in a wireless manner as at least one auxiliary strobe, the at least one auxiliary strobe being capable of repeatedly emitting auxiliary flashes of light; with each exposure repeatedly emitting the intermittent primary flashes of light of a variable intensity from the primary strobe, the variable intensity of each of the intermittent primary flashes of light being determined by a light intensity determination circuit within the primary strobe based on photographic information conveyed from the camera including a distance from the camera to an object being photographed, a diaphragm value of a lens being used on the camera, and a speed of film being used in the camera;

detecting commencement of each of the intermittent primary flashes of light without monitoring cessation of each of the intermittent primary flashes of light; and actuating the at least one auxiliary strobe to emit the auxiliary flashes of light in response to each of the intermittent primary flashes of light.

13. The method of claim 12, further comprising the steps of:

causing a first switch within the primary strobe to switch to a primary position connecting the camera to a trigger device within the primary strobe thereby allowing the camera to trigger the emitting of flashes from the primary strobe;

setting a first switch within the at least one auxiliary strobe to an auxiliary position connecting a trigger device to a detector within the at least one auxiliary strobe, thereby allowing the detector to trigger the emitting of flashes from the at least one auxiliary strobe upon detecting flashes from the primary strobe.

14. The method of claim 12, further comprising the step of:

measuring and integrating the quantity of light emitted from the primary strobe and the at least one auxiliary strobe and causing the cessation of the primary and auxiliary flashes when the quantity of light from the primary and auxiliary strobes reaches a preselected quantity.

15. The method of claim 12, further comprising the step of setting a second switch within the at least one auxiliary strobe to an auxiliary position connecting a light cessation device to a timer within the auxiliary strobe for controlling a duration of the flashes emitted from the auxiliary strobe.

16. The method of claim 12, further comprising the step of setting the intensity of the flashes emitted from the primary strobe and the at least one auxiliary strobe.

17. The method of claim 12, further comprising the step of sending a light emission commencement instruction from the camera to the primary strobe to cause the primary strobe to begin emitting the flashes of light.

18. The method of claim 12, further comprising the step of manually setting the intensity of each of the primary flashes of light regardless of the intensity determined by the light intensity determination circuit.

19. The method of claim 18, further comprising the step of displaying the intensity of each of primary flashes of light on a display device disposed on the primary strobe.

20. A wireless light amplifying strobe system for a camera controlling the light emission of multiple strobes, comprising:

distinguishing means located within each of the strobes for automatically setting each of the strobes to be in one of two states: a primary state when one of the strobes is attached to the camera and operates in a wired manner as a primary strobe, the primary strobe being capable of emitting intermittent primary flashes of light; with each exposure and an auxiliary state when at least one of the strobes is not attached to the camera and operates in a wireless manner as at least one strobe, the auxiliary strobe being capable of emitting auxiliary flashes of light; with each e light intensity determination means within the primary strobe for determining an intensity of each of the intermittent primary flashes of light based on photographic information conveyed from the camera, the photographic information including a distance from the camera to an object being photographed, a diaphragm value of a lens being used on the camera and a speed of film being used in the camera; and detection means in the auxiliary strobe for detecting commencement of each of said intermittent primary flashes of light and actuating the auxiliary strobe to emit the auxiliary flashes in response to each of said intermittent primary flashes of light, the detection means detecting commencement of said intermittent primary flashes of light and actuating the auxiliary strobe without monitoring the cessation of each of said intermittent primary flashes of light.

21. The system of claim 20, further comprising light radiation intensity setting means contained in the primary and auxiliary strobe means for setting the intensity of the flashes emitted from the primary and auxiliary strobe means.

22. The system of claim 20, wherein the detector means in the auxiliary strobe means includes:

light emission detection means for detecting the commencement of each of the primary flashes and outputting a detection signal in response to the detected primary flashes; and trigger means connected to the light emission detection means for sensing the detection signal and for triggering the auxiliary strobe means to emit an auxiliary flash in response to the detection signal.

23. The system of claim 20, further comprising lighting cessation means connected to the primary and auxiliary strobe means for causing the strobe means to cease emitting said flashes of light.

24. The system of claim 23, further comprising timer means within the auxiliary strobe means, said timer means connected to the lighting cessation means, said timer means controlling a duration of the auxiliary flashes.

25. The system of claim 20, further comprising light intensity specification means disposed on the primary strobe for manually setting the intensity of each of the primary flashes of light regardless of the light intensity determined by the light intensity determination circuit.

26. The system of claim 25, further comprising display means disposed on the primary strobe for displaying the intensity of each of the primary flashes of light.

27. The system of claim 20, further comprising trigger device means within the primary and auxiliary strobe means for triggering the primary and auxiliary flashes.

28. The system of claim 27, further comprising switching means within the primary and auxiliary strobe means for causing a first switch and a second switch within the primary and auxiliary strobe means to switch to a primary position when one of the strobes means is in the primary state and to an auxiliary position when one of the strobe means is in the auxiliary state.

29. The system of claim 28, wherein the first switch connects the trigger means to the detector means when the distinguishing means determines that the strobe is in the auxiliary state and connects the trigger means to the camera when the distinguishing means determines that the strobe means is in the primary state.

30. The system of claim 29, further comprising light measuring and integrating means within the camera for measuring and integrating a quantity of light emitted from the primary and auxiliary strobe means and for outputting a light emission cessation signal to the trigger device in the primary strobe means.

* * * * *